United States Patent
Barki

(10) Patent No.: US 12,470,528 B2
(45) Date of Patent: Nov. 11, 2025

(54) END TO END ENCRYPTED BROWSE BASED AD HOC COMMUNICATION

(71) Applicant: PUBLIC IM LTD., Tel Aviv (IL)

(72) Inventor: Yaacov Barki, Tel Aviv (IL)

(73) Assignee: PUBLIC IM LTD., Tel Aviv (IL)

( * ) Notice: Subject to any disclaimer, the term of this patent is extended or adjusted under 35 U.S.C. 154(b) by 190 days.

(21) Appl. No.: 18/034,872

(22) PCT Filed: Oct. 29, 2021

(86) PCT No.: PCT/IB2021/060001
§ 371 (c)(1),
(2) Date: May 1, 2023

(87) PCT Pub. No.: WO2022/091007
PCT Pub. Date: May 5, 2022

(65) Prior Publication Data
US 2024/0022549 A1    Jan. 18, 2024

Related U.S. Application Data

(60) Provisional application No. 63/107,419, filed on Oct. 29, 2020.

(51) Int. Cl.
H04L 9/40    (2022.01)

(52) U.S. Cl.
CPC .......... H04L 63/0435 (2013.01); H04L 63/06 (2013.01); H04L 63/102 (2013.01)

(58) Field of Classification Search
None
See application file for complete search history.

(56) References Cited

U.S. PATENT DOCUMENTS

| | | | |
|---|---|---|---|
| 11,095,774 B1 * | 8/2021 | Willshire | G06F 9/547 |
| 11,824,840 B1 * | 11/2023 | Meixler | H04L 9/3247 |
| 2002/0124169 A1 * | 9/2002 | Agrawal | H04L 63/08 |
| | | | 380/278 |

(Continued)

FOREIGN PATENT DOCUMENTS

| | | | | |
|---|---|---|---|---|
| WO | WO-2009026192 A2 * | 2/2009 | | H04W 88/04 |
| WO | WO-2009070430 A2 * | 6/2009 | | G06F 21/32 |

*Primary Examiner* — Kaveh Abrishamkar
(74) *Attorney, Agent, or Firm* — Reches Patents

(57) ABSTRACT

A method for end to end encrypted (ETEE) communication, the method is executed by a web application of a first user and may include (a) participating in creating first user ETEE communication metadata; wherein the first user ETEE metadata comprise a first user identifier and one or more first user keys; (b) receiving a request from the first user to initiate a ETEE communication session with a second user that has a second user ETEE communication metadata; (c) determining an existence of ETEE communication session metadata, the ETEE communication session metadata facilitates an establishment of a session between the first user and the second user; (d) requesting to receive, from a ETEE communication service, the ETEE communication session metadata when not finding the ETEE communication session metadata; and (e) participating in establishing and maintaining the session between the first user and the second user when finding or receiving the ETEE communication session metadata.

22 Claims, 5 Drawing Sheets

(56) References Cited

U.S. PATENT DOCUMENTS

| | | | |
|---|---|---|---|
| 2012/0216271 A1* | 8/2012 | Cooper | H04L 63/0254 |
| | | | 726/11 |
| 2015/0189504 A1* | 7/2015 | Chew | H04W 4/80 |
| | | | 713/168 |
| 2016/0212093 A1* | 7/2016 | Meixler | H04L 51/48 |
| 2024/0039899 A1* | 2/2024 | Meixler | H04L 9/3247 |

* cited by examiner

END TO END ENCRYPTED BROWSE BASED AD HOC COMMUNICATION

CROSS REFERENCE

This application claims priority from U.S. provisional patent Ser. No. 63/107,419 filing date Oct. 29, 2020, which is incorporated herein in its entirety.

BACKGROUND

There is a growing need to exchange information in a secure manner Encryption that heavily relies and on servers (such as Proton Mail) may be problematic.

BRIEF DESCRIPTION OF THE DRAWINGS

In order to better understand the subject matter that is disclosed herein and to exemplify how it can be carried out in practice, embodiments will now be described, by way of non-limiting example only, with reference to the accompanying drawings, in which.

DETAILED DESCRIPTION OF EMBODIMENTS

Figure 1:
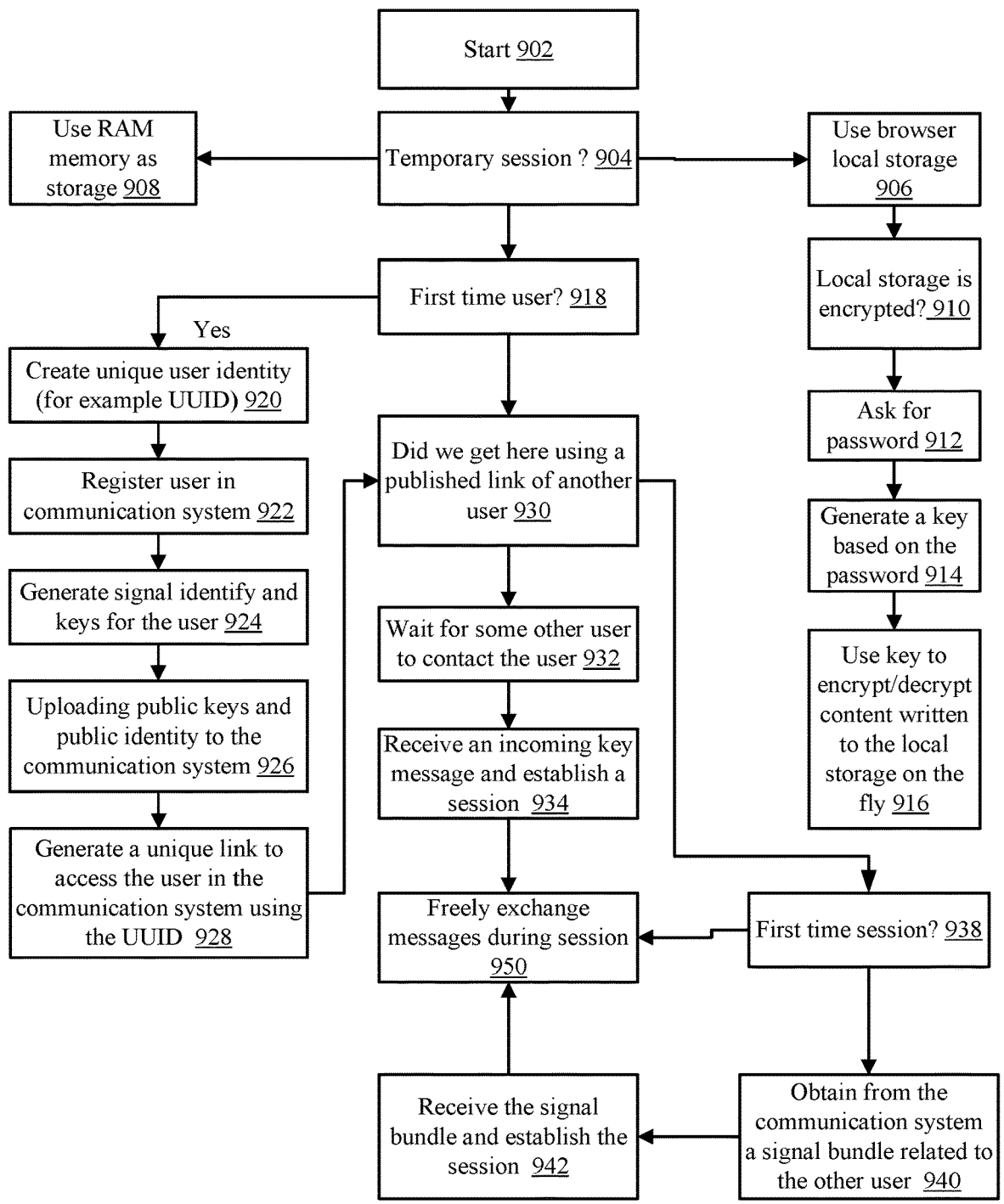
FIG. 1 is a schematic illustration of a method.

In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "receiving", "generating", "distributing", "identifying", "regulating", "sending" or the like, refer to the action(s) and/or process(es) of a computer that manipulate and/or transform data into other data, the data represented as physical, such as electronic, quantities and/or the data representing the physical objects. The term "computer" should be expansively construed to cover any kind of electronic device with data processing capabilities, including, by way of non-limiting example, processing unit 201 disclosed in the present application.

The terms "processing unit", "computer", "processing device", "computer processing device" or the like should be expansively construed to include any kind of electronic device with data processing circuitry, which includes a computer processor as disclosed herein below (e.g., a Central Processing Unit (CPU), a microprocessor, an electronic circuit, an Integrated Circuit (IC), firmware written for or ported to a specific processor such as digital signal processor (DSP), a microcontroller, a field programmable gate array (FPGA), an application specific integrated circuit (ASIC), etc.) and is capable of executing various computer instructions (stored for example on a computer memory operatively connected therewith).

The operations in accordance with the teachings herein can be performed by a computer specially constructed for the desired purposes or by a general-purpose computer specially configured for the desired purpose by a computer program stored in a computer readable storage medium.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

There may be provided a method for end to send encrypted browser based ad hoc communication.

The communication may be used in relation to instant messaging—or in other contexts. The communication can be of any form—video, audio, phone, text—in any platform and/or application—including social media, conference call, video conferencing, Whattsup.

There may be provided a method that may include using a user agent such as a web browser to exchange end to end encrypted messages with other clients (using for example web applications, mobile apps and desktop apps).

For simplicity of explanation the following example may refer to a user agent that is a web browser and to a web application executed by the web browser.

Figure 2:
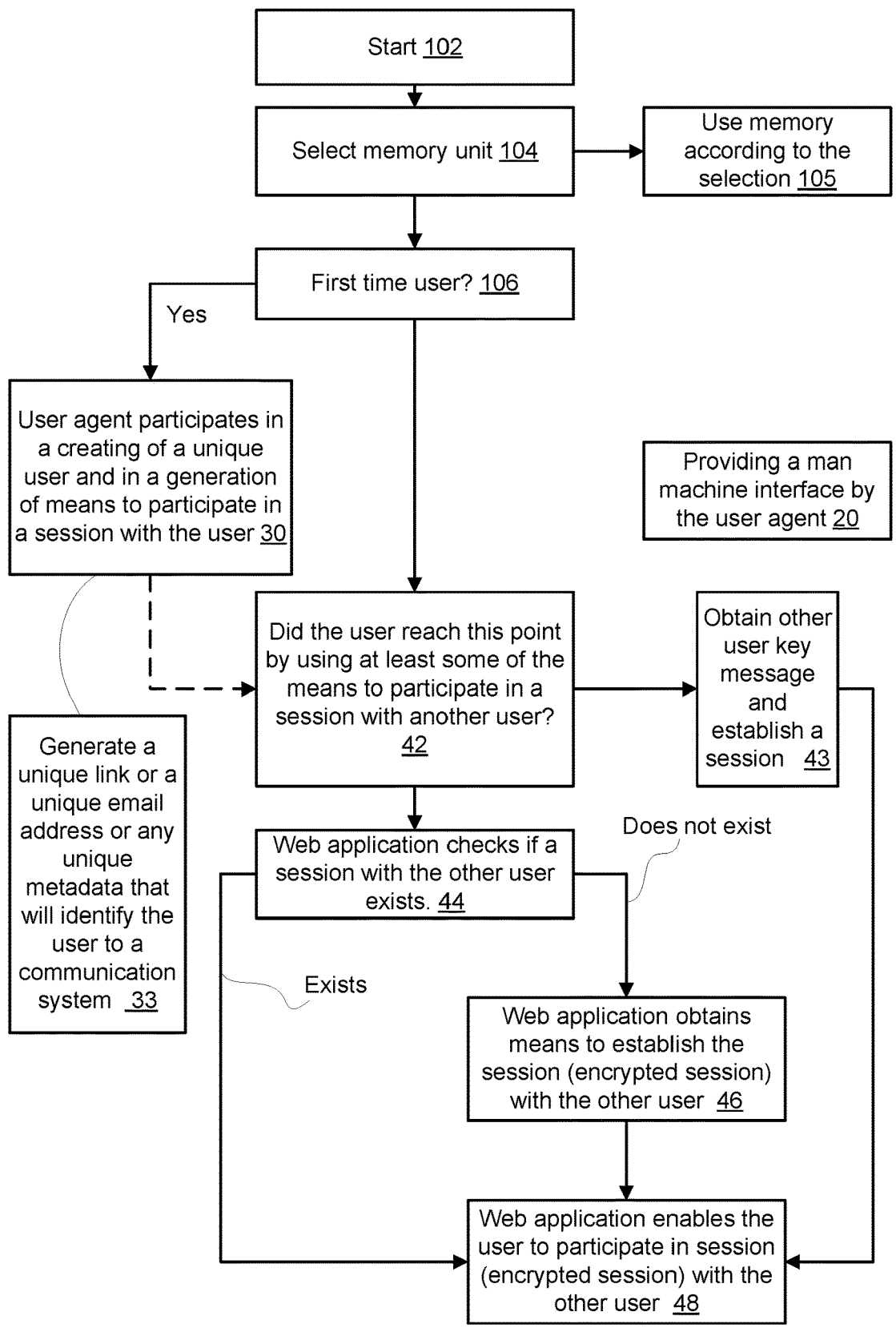
FIG. 2 is a schematic illustration of a method.
Figure 3:
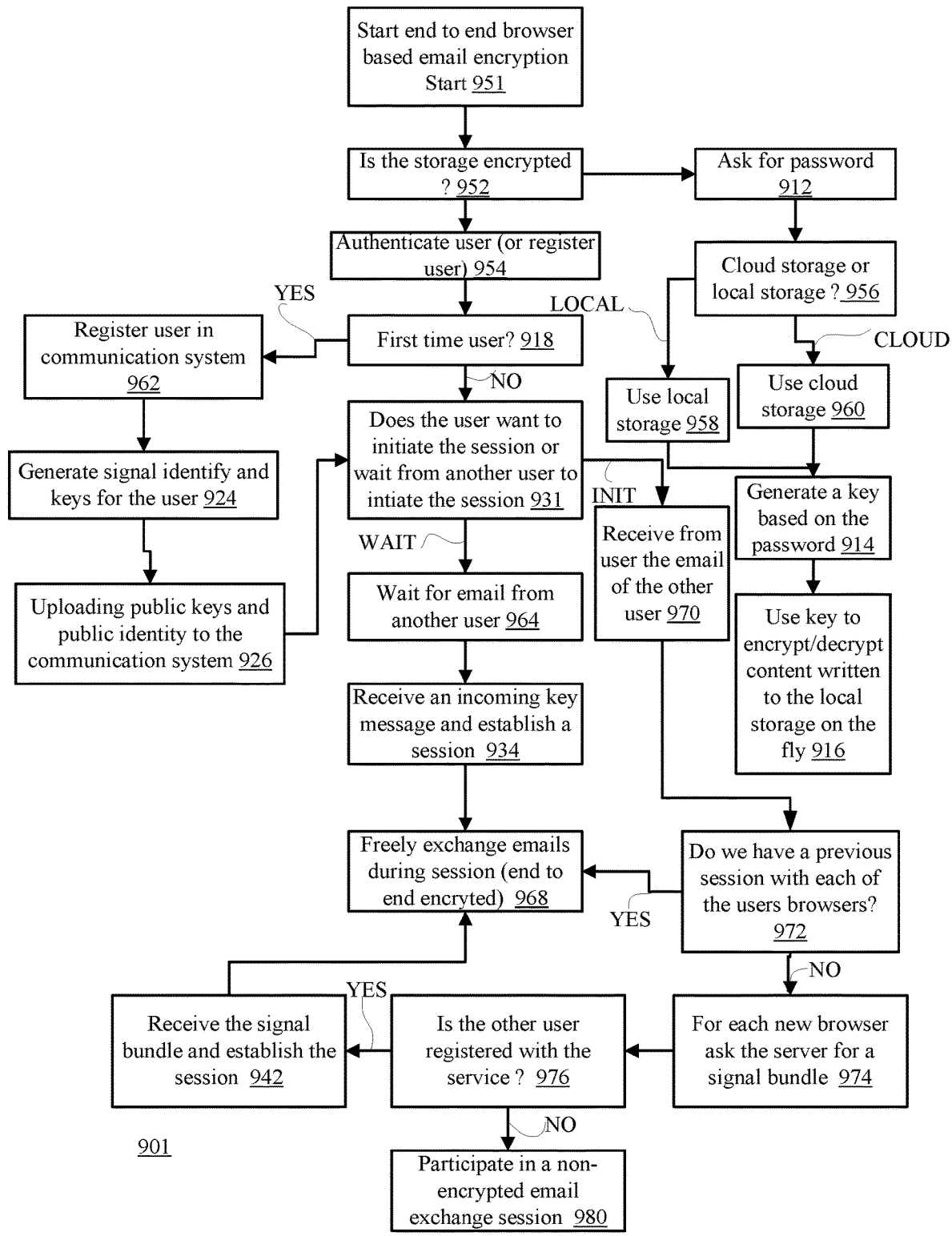
FIG. 3 is a schematic illustration of a method.

FIGS. 1-3 illustrates examples of methods for ad hoc end to end encryption.

Ad hoc may mean—for example that the user devices do not need to have a previously downloaded application.

The suggested end to end encryption—especially when keys are stored in local storage—especially private keys are not sent to servers—provides a high degree of security.

FIG. 1 illustrates an example of a method 900 for ad hoc end to end encrypted communication.

Method 900 may start by START step 902. It may include determining to initiate the ad hoc end to end encrypted communication or receiving a request to initiate ad hoc end to end encrypted communication.

Step 902 may be followed by step 904 checking whether the session is a temporary session. The determination may be based on the location of the user device (for example whether the user uses insecure devices or networks), previous sessions conducted by the user, user input and/or system metadata or system determination.

If so—jumping to step 908 of using the RAM memory as storage for the session. RAM memory means that the session history is not saved.

If no—using the browser local storage 906.

The local storage is a nonvolatile storage within the user device that may be allocated for the usage of the client agent—for example for the web browser. It may be used to store, at least, keys (including private keys of the user, one or more public keys of the user, and session pre-keys).

A signal identity—includes a user signature, user keys and pre-session keys. The user keys include public user keys and private user keys.

The user keys include a public user ID key, a private user ID key, a public signed key, a private signed key.

The user signature may be generated from private signed key—and may be verified by the public signed key.

The pre-session keys may be time keys to be used as session pre-keys for initiating the sessions. One pre-key may be allocated for a session with another user.

A signal bundle may include the public user keys of the signal identity, the user signature and a session pre-key.

Step 906 may be followed by step 910 of checking if the local storage is encrypted and if so—(there is a need for access control) then asking (step 912) for a password, generating a key using a password based key derivation function (step 914), and using the key to encrypt/decrypt data written to or read from the storage on the fly—during the session (step 916)—for example store keys for establishing a session.

It is noted that instead of using the browser local storage—method 900 may use a remote storage (for example a cloud storage or another remote storage)—and when using a remote storage the access to the remote storage may be access protected—for example using a password and user name, biometric means and the like.

In any case step 904 may be followed by step 918 of asking whether the user (of the session) is a first time user (not previously registered with the service). The service means the end to end encrypted communication service.

If the user is a first time user than step 918 is followed by a sequence of steps 920, 922, 924, 926 and 928.

Step 920 may include creating a local identity to the user (for example obtaining a user UUID).

Step 922 may include registering the user with the service (communication system).

Step 924 may include generating a signal identity and keys (for allowing to establish a session with another registered user).

Step 926 may include uploading public keys and public identity to the communication system server.

Step 928 may include generating a unique link to access the user in the communication system using the UUID. The UUID may be explicitly included in the unique link—but this is not necessarily so.

For example—assuming that the communication session is associated with a domain WWW.PUBLIC-COMM-.COM—then the unique link may be WWW.PUBLIC-COMM.COM/UUID The unique link can be provided (published) to one or more other users that may request to communicate with the user in any manner—using any social media, SMS, MMS, email, whattsup message, mail, voice message or by using any external facility.

Step 928 is followed by step 930.

If the user is not a first time user then step 918 is followed by to step 930 of checking whether the process got to step 930 by using a published link of the other user 930. If—so—jumping to a path that starts by step 938. If not—jumping to a path that starts by step 932.

Step 928 is followed by step 930.

When the user waits for another user to start the session then step 930 may be followed by step 932 of waiting for someone to contact the user, step 934 of establishing a session from an incoming key message, and step 950 of freely exchanging messages using end to end encryption.

When the process got to step 930 by using a published link of the other user—then step 930 is followed by step 938 of checking is it is a first time session. If not—jumping to step 950.

If it is the first time session then step 938 is followed by step 940 of obtaining from the communication system a signal bundle related to the other user 940 and step 942 of establishing the session using the signal bundle. Step 942 may be followed by step 950.

FIG. 2 illustrates an example of method 100 for ad hoc end to end encrypted communication.

For simplicity of explanation it is assumed that the method is executed by a web application executed by a web browser of a user device.

Method 100 starts by START step 102 in which the method begins.

Step 102 may be followed by step 104 of selecting which memory unit to use. The memory unit may belong to the user device, to a remote system, may be a RAM memory (or any other memory that is cleared once a session ends), a browser memory—or any other memory that maintains session metadata—such as session bundles or any means for establishing and/or maintaining an end to end encrypted session.

The selection can be made in any manner—based on available memory resources, based on user preferences, based on user's history, based on communication system defaults and the like. The use may provide input.

Once the memory is selected—the memory is used during a following session.

Step 104 may be followed by step 106 of asking whether the user is a first time user. A first time user is a user that did not use the service (end to end encrypted communication) before—or a user that does not have his detailed accessible to the web application for any other reason.

If so—step 106 is followed by step 30 of having a user agent (of the user) participate in a creating of a unique user and in a generation of means to participate in a session with the user.

In order to benefit from the service the user has to have a user identifier (unique in the service) and means (such as keys, signal identity, any other metadata—and the like) to be able to participate in a session with another user of the service.

The participation means that the user agent may request the service and/or another entity to assist or generate or send any require means.

Once completed—the method may end—or step 30 may be followed by step 42.

If the user is not a first time user—step 106 is followed by step 42.

Step 42 may include checking whether the user reached this point by using at least some of the means to participate in a session with another user.

The user may reach this point by using at least some of the means to participate in a session with another user—if he used at least a part of the products of an execution of step 30 by a user agent of another user. For example—if the user used a unique link of the other user to reach step 42.

If not—step 42 may be followed by step 43 of obtain another user key message and establish a session. Step 43 is followed by step 48.

If yes—step 42 may be followed by step 44 of checking if the session with the other user exists—for example if the signal bundle is accessible (for example not erased from the browser local memory)—and is so jumping to step 48.

If not—step 44 is followed by step 46 of obtaining means to establish the session (end to end encrypted session) with the other user. Step 46 is followed by step 48 of having the web application enable the user to participate in session with the other user.

FIG. 3 illustrate method 901 for end to end browser based encrypted communication. communication.

Method 901 starts by start step 951.

Step 901 may be followed by step 952 of checking whether the storage used for the session is encrypted.

If so—step 952 is followed by step 912 of asking for a password, step 912 is followed by step 956 of checking if the storage is a cloud storage or a local storage—and if local storage then step 956 is followed by step 958 of using local storage. If a cloud storage—then step 956 is followed by step 960 of using the cloud storage.

Steps 958 and 960 may be followed by step 914 of generating a key based on the password (for example by using a password based key derivation function—such as PBKDF2), and step 916 of using the key (generated during step 914) to encrypt/decrypt data written to or read (during step 916) from the storage on the fly.

Step 952 may be followed by step 954 of authenticating the user. If the user is not registered to the service then a registration process is executed.

Assuming that the user registered—step 954 is followed by step 918 of asking whether the user (of the session) is a first time user (not previously registered).

If the user is a first time user step 918 is followed by a sequence of steps 962, 924 and 926.

Step 962 may include registering a new browser for the user. Step 924 may include generating a signal identity and keys. Step 926 may include uploading public keys and public identity to a server. Step 926 may be followed by step 931.

If the user is not a first time user then jumping to step 931 of checking whether the user wants to initiate the session or wait from another user to initiate the session.

If the user want to wait—step 931 is followed by a sequence of steps 964, 934 and 968.

Step 964 may include waiting for an incoming email. Step 934 may include receiving an incoming key message and establishing a session from the incoming key message. Step 968 may include freely exchanging end to end encrypted email messages.

If the user wants to initiate a session with another user then step 931 is followed by a sequence of steps 970 and 972.

Step 970 may include receiving the email of the other user. Step 972 may include asking whether we have a previous session with each of the target user's browsers.

If so—step 972 may be followed by step 968. If no—step 972 may be followed by step 974 of asking, for each new browser, the server for a signal bundle (registration id, device id, signed key, signature, per key).

Step 974 may be followed by step 976 of checking of the target user registered with the service. If yes—establishing a section using the bundle (step 978). If not—exchanging unencrypted email messages (step 980).

A reference to an end to end encrypted communication may be applied mutatis to an ad hoc end to end encrypted communication.

Figure 4:
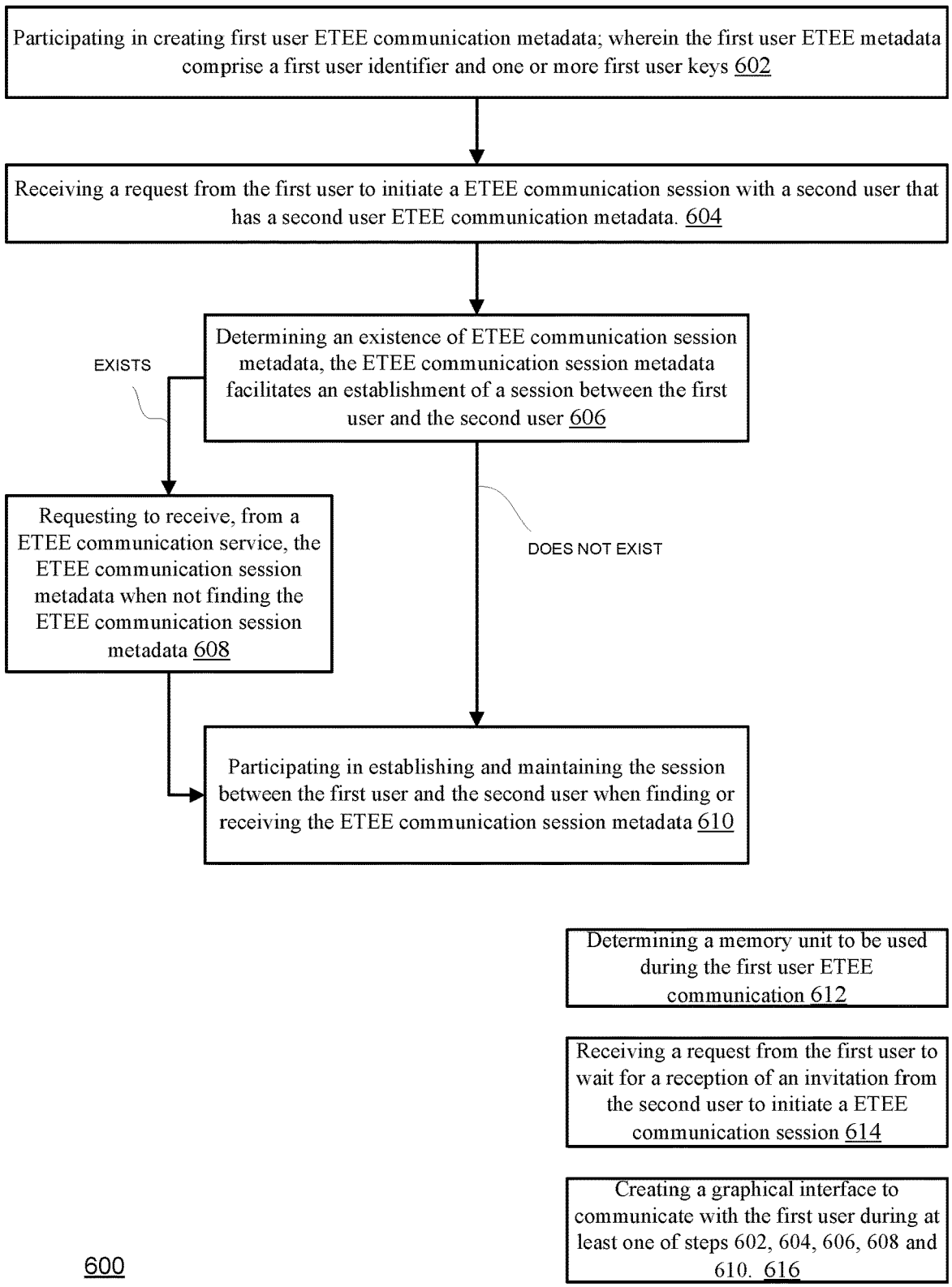
FIG. 4 is a schematic illustration of a method.

FIG. 4 illustrates method 600 for end to end encrypted (ETEE) communication.

Method 600 may be used for ad hoc end to end encrypted (AHETEE) communication or for non-ad hoc ETEE communication. The latter may require acquiring a preliminary registration to a service. It may also include obtaining unique email address for each of the participating users.

The method is executed by a web application of a first user. A second user should have his own web application to participate in the session.

Method 600 may include step 602 of participating in creating first user ETEE communication metadata. The first user ETEE metadata may include a first user identifier and one or more first user keys. The first user ETEE metadata may include a signal identity (or a part thereof). Step 600 may include, for example, steps 920, 022, 924, 926 and 928, and/or include step 30 and/or include steps 962, 924 and 926.

Step 602 may be followed by step 604 of receiving a request from the first user to initiate a ETEE communication session with a second user that has a second user ETEE communication metadata.

Step 604 may be followed by step 606 of determining an existence of ETEE communication session metadata, the ETEE communication session metadata facilitates an establishment of a session between the first user and the second user. Step 606 may include, for example, step 938 and/or step 44 and/or step 972. The ETEE communication session metadata may include at least a part of the users ETEE communication metadata that participate in the session—for example the pre key sued to initiate the session and users public keys.

If not found—step 606 may be followed by step 608 of requesting to receive, from a ETEE communication service, the ETEE communication session metadata. Step 608 may include receiving the ETEE communication session metadata.

Steps 606 and 608 may be followed by step 610 participating in establishing and maintaining the session between the first user and the second user when finding or receiving the ETEE communication session metadata. Step 610 may include, for example step 950 and/or step 48 and/or step 968.

Method 600 may also include step 612 of determining a memory unit to be used during the first user ETEE communication. Step 612 may include selecting a location (remote memory, cloud memory, local memory, and the like) of the memory unit. Additionally or alternatively, step 612 may include selecting whether the memory unit stores the ETEE communication session metadata.

Step 612 may include, for example, steps 904, 906, 908, and/or step 104 and/or step 956. Step 612 is followed by using the memory unit according to the definitions—and may include steps 958 and/or 960 and/or step 105 and/or step 908 or steps 912, 914, and 916.

The first user ETEE communication metadata may include a unique link that identifies the user to the ETEE communication service.

Step 602 may include requesting the ETEE communication service to generate at least a part of the first user ETEE communication metadata.

Method 600 may also include step 614 of receiving a request from the first user to wait for a reception of an invitation from the second user to initiate a ETEE communication session. Step 614 may include, for example, steps 932 and 834 and/or step 43 and/or steps 964 and 934.

Method 600 may also include step 616 of creating a graphical interface (or any other man machine interface) to communicate with the first user during at least one other step of the method.

Figure 5:
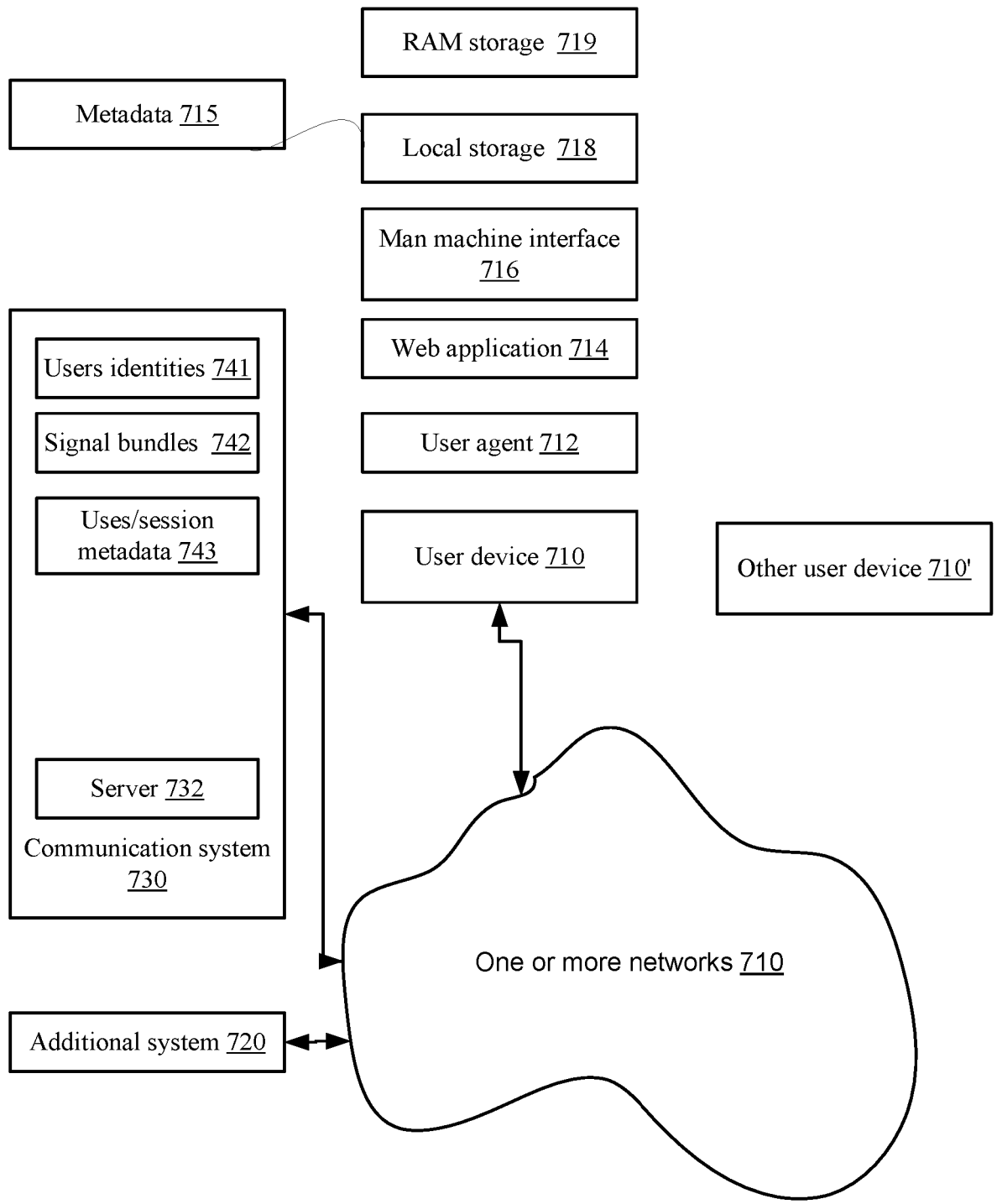
FIG. 5 is an example of a communication system and its environment.

FIG. 5 illustrates an example of communication system 730 that may include one or more servers—such as server 730. The communication service 730 may have any other compute and/or storage resources and is responsible to provide the ETEE communication service.

The figure illustrates user identifiers 741, single bundles 742 and user/session metadata 743 such as user ETEE communication metadata, AHETEE communication session metadata, and the like. The figure also illustrates a user device 710 (mobile phone, smartphone, any computerized device or communication device) that may host a user agent 712 that may run a web application 714. The figure also illustrates a man machine interface 716 that can be created by the web interface, a local storage 718, a RAM storage 719, and the like. The local storage is shown as illustrated as storing metadata 715 such as the signal identity of the user, a signal bundle and/or any keys or metadata mentioned in the application. The figure also illustrates another user device 710' that may host a user agent that may execute a web application. The user and the other user may also be referred to as first user and second user. Any reference to "an other" should be treated as a reference to "another".

Various examples of implementing end to end encryption are illustrated below.

Web browser to other clients process emphasizing end to end encryption done locally in the browser.
  i. Generate a persistent identity on the client side
  ii. Send public credentials to the server for storage
  iii. Request public credentials from the server for another client
  iv. Exchange end to end encrypted messages The method may use a web browser app—a javascript app that runs on the web browser as a standalone app and a backend server—used to relay messages between clients.

The web browser app may be configured to:
  i. Generate an identity (a set of encryption key pairs, numeric IDs and cryptographic signatures)—the public keys and public data (IDs and signature) is sent to the server and is stored on the server (but also locally using the device local storage).
  The combination of public keys IDs and a signature are referred to as a bundle.
  ii. Request a bundle from the server for a specific user, identified by an IM code
  This bundle is used to initiate an end to end encrypted session
  iii. Encrypt messages locally and send those messages to the server for relay to other clients
  iv. Receive messages from the server, and decrypt those messages locally The backend server may be configured to:
  i. Store bundles for clients and serve as a discovery service for other clients
  ii. Provides bundles to clients identified by an IM code
  iii. Relay encrypted messages between clients—the server is unable to decrypt those messages and serves as a blind broker Process Number 1

Process Name: Generate identity locally
The functionality of the process: Generate a set of key pairs and cryptographic signatures locally.
The web browser takes this process upon first use.
It uses the signal message encryption protocol, but can use any other end to end encryption scheme.
It generates a numeric fixed ID, a numeric device ID, and the following curve 25519 cryptographic key pairs:
  i. Identity key pair
  ii. Signed key pair (a standard key cryptographically signed using the identity key)
  iii. A large amount of unsigned key pairs
The process runs locally without interacting with a server using standard native javascript.
Upon completion, the public keys, identity numbers and the signature are uploaded to the server and saved for other clients that will want to initiate a session with the client.
An example of a standard encryption protocol is the Signal protocol. Other protocols may be used—standard or proprietary.

Process Number 2

Process Name: Establish a chat session
The functionality of the process: Establish an end to end encrypted session between two clients
For the purpose of this process, the initiating client browser is called Bob, and the approached browser is called Alice.
  i. Bob requests a bundle from the server for Alice
  ii. The server generates the public bundle of Alice using the identity keys, identity numbers, signature, signed key and one of the unsigned keys
  iii. If the server runs out of unsigned keys—it saves the last key as a last resort key and reuses it when another bundle is requested, but also notifies Alice to generate additional unsigned keys.
  iv. Bob receives the bundle, generates a local session and stores this session in the browser local storage.
  v. Bob encrypts a message using the local session, and sends a message to Alice using the server
  vi. The server receives the encrypted message, and relays it is using a web push notification to Alice, the server cannot decrypt this message
  vii. Alice receives the message, and is able to decrypt it and establish a session with Bob, this session is stored locally at Alice's local storage
  viii. Alice and Bob can now exchange messages based using their locally saved session The method may use various security protocols—such as but not limited to a Remote Authentication Dial-In User Service (RADIUS) protocol.

There may be provided a method for end to end encrypted (ETEE) communication, the method may be executed by a web application of a first user and may include (a) participating in creating first user ETEE communication metadata; wherein the first user ETEE metadata may include a first user identifier and one or more first user keys; (b) receiving a request from the first user to initiate a ETEE communication session with a second user that has a second user ETEE communication metadata; (c) determining an existence of ETEE communication session metadata, the ETEE communication session metadata facilitates an establishment of a session between the first user and the second user; (d) requesting to receive, from a ETEE communication service, the ETEE communication session metadata when not finding the ETEE communication session metadata; and (e)

participating in establishing and maintaining the session between the first user and the second user when finding or receiving the ETEE communication session metadata.

The ETEE communication may be ad hoc ETEE communication.

The method may include determining a memory unit to be used during the first user ETEE communication; wherein the determining may include selecting a location of the memory unit.

The method may include determining a memory unit to be used during the first user ETEE communication; wherein the determining may include selecting whether the memory unit stores the ETEE communication session metadata.

The method may include determining a memory unit to be used during the first user ETEE communication; wherein the determining may include determining whether to apply access control to the memory unit.

The first user ETEE communication metadata may include a unique link that identifies the user to the ETEE communication service.

The participating in creating first user ETEE communication metadata may include requesting the ETEE communication service to generate at least a part of the first user ETEE communication metadata.

The method may include receiving a request from the first user to wait for a reception of an invitation from the second user to initiate a ETEE communication session.

The method may include creating a graphical interface to communicate with the first user during at least one of steps (a), (b), (c), (d) and (e).

The method may include executing step (a) when the first user first accesses the web application.

The ETEE communication session metadata may include a signal bundle.

The ETEE communication differs from ad hoc ETEE communication.

The method may include determining a memory unit to be used during the first user ETEE communication; wherein the determining may include selecting a location of the memory unit.

The method may include determining a memory unit to be used during the first user ETEE communication; wherein the determining may include selecting whether the memory unit stores the ETEE communication session metadata.

The method may include determining a memory unit to be used during the first user ETEE communication; wherein the determining may include determining whether to apply access control to the memory unit.

The first user ETEE communication metadata may include a unique email address that identifies the user to the ETEE communication service.

The participating in creating first user ETEE communication metadata may include requesting the ETEE communication service to generate at least a part of the first user ETEE communication metadata.

The method may include receiving a request from the first user to wait for a reception of an invitation from the second user to initiate a ETEE communication session.

The method may include creating a graphical interface to communicate with the first user during at least one of steps (a), (b), (c), (d) and (e).

The method may include executing step (a) when the first user first accesses the web application.

The ETEE communication session metadata may include a signal bundle.

There may be provided a non-transitory computer readable medium for end to end encrypted (ETEE) communication, the non-transitory computer readable medium stores instructions that once executed by a web application of a first user, cause the web application to: (a) participate in creating first user ETEE communication metadata; wherein the first user AHETEE metadata may include a first user identifier and one or more first user keys; (b) receive a request from the first user to initiate a ETEE communication session with a second user that has a second user ETEE communication metadata; (c) determine an existence of ETEE communication session metadata, the ETEE communication session metadata facilitates an establishment of a session between the first user and the second user; (d) request to receive, from a ETEE communication service, the ETEE communication session metadata when not finding the ETEE communication session metadata; and (e) participate in establishing and maintaining the session between the first user and the second user when finding or receiving the ETEE communication session metadata.

The ETEE communication may be ad hoc ETEE communication.

The non-transitory computer readable medium that stores instructions for determining a memory unit to be used during the first user ETEE communication; wherein the determining may include selecting a location of the memory unit.

The non-transitory computer readable medium that stores instructions for determining a memory unit to be used during the first user ETEE communication; wherein the determining may include selecting whether the memory unit stores the ETEE communication session metadata following.

The non-transitory computer readable medium that stores instructions for determining a memory unit to be used during the first user ETEE communication; wherein the determining may include determining whether to apply access control to the memory unit.

The first user ETEE communication metadata may include a unique link that identifies the user to the ETEE communication service.

The participating in creating first user ETEE communication metadata may include requesting the ETEE communication service to generate at least a part of the first user ETEE communication metadata.

The non-transitory computer readable medium that stores instructions for receiving a request from the first user to wait for a reception of an invitation from the second user to initiate a ETEE communication session.

The non-transitory computer readable medium that stores instructions for creating a graphical interface to communicate with the first user during at least one of steps (a), (b), (c), (d) and (f).

The non-transitory computer readable medium that stores instructions for executing step (a) when the first user first accesses the web application.

The ETEE communication session metadata may include a signal bundle.

The ETEE communication differs from ad hoc ETEE communication.

The ETEE communication differs from ad hoc ETEE communication.

The non-transitory computer readable medium that stores instructions for determining a memory unit to be used during the first user ETEE communication; wherein the determining may include selecting a location of the memory unit.

The non-transitory computer readable medium that stores instructions for determining a memory unit to be used during the first user ETEE communication; wherein the determining may include selecting whether the memory unit stores the ETEE communication session metadata following.

The non-transitory computer readable medium that stores instructions for determining a memory unit to be used during the first user ETEE communication; wherein the determining may include determining whether to apply access control to the memory unit.

The first user ETEE communication metadata may include a unique email address that identifies the user to the ETEE communication service.

The participating in creating first user ETEE communication metadata may include requesting the ETEE communication service to generate at least a part of the first user ETEE communication metadata.

The non-transitory computer readable medium that stores instructions for receiving a request from the first user to wait for a reception of an invitation from the second user to initiate a ETEE communication session.

The non-transitory computer readable medium that stores instructions for creating a graphical interface to communicate with the first user during at least one of steps (a), (b), (c), (d) and (e).

The non-transitory computer readable medium that stores instructions for executing step (a) when the first user first accesses the web application.

The ETEE communication session metadata may include a signal bundle.

Those skilled in the art will readily appreciate that various modifications and changes can be applied to the embodiments of the invention as hereinbefore described without departing from its scope, defined in and by the appended claims.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more"

or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

I claim:

1. A method for end to end encrypted (ETEE) communication, the method is executed by a web application of a device of a first user and comprises:
   (a) participating in creating first user ETEE communication metadata; wherein the first user ETEE metadata comprise a first user identifier and one or more first user keys;
   (b) receiving a request from the first user to initiate a ETEE communication session with a second user that has a second user ETEE communication metadata;
   (c) determining an existence of ETEE communication session metadata, the ETEE communication session metadata facilitates an establishment of a session between the first user and the second user;
   (d) requesting to receive, from a ETEE communication service, the ETEE communication session metadata when not finding the ETEE communication session metadata; and
   (e) participating in establishing and maintaining the session between the first user and the second user when finding or receiving the ETEE communication session metadata.

2. The method according to claim 1 wherein the ETEE communication is ad hoc ETEE communication that is operable without having an ETEE communication application downloaded in advance to the device of the first user, before starting an execution of the method.

3. The method according to claim 2 comprising determining a memory unit to be used during the first user ETEE communication; wherein the determining comprises selecting a location of the memory unit.

4. The method according to claim 2 comprising determining a memory unit to be used during the first user ETEE communication; wherein the determining comprises selecting whether the memory unit stores the ETEE communication session metadata.

5. The method according to claim 2 comprising determining a memory unit to be used during the first user ETEE communication; wherein the determining comprises determining whether to apply access control to the memory unit.

6. The method according to claim 2 wherein the first user ETEE communication metadata comprises a unique link that identifies the user to the ETEE communication service.

7. The method according to claim 2 wherein the participating in creating first user ETEE communication metadata comprises requesting the ETEE communication service to generate at least a part of the first user ETEE communication metadata.

8. The method according to claim 2 comprising receiving a request from the first user to wait for a reception of an invitation from the second user to initiate a ETEE communication session.

9. The method according to claim 2 comprising creating a graphical interface to communicate with the first user during at least one of steps (a), (b), (c), (d) and (e).

10. The method according to claim 2 comprising executing step (a) when the first user first accesses the web application.

11. The method according to claim 2 wherein the ETEE communication session metadata comprises a signal bundle.

12. The method according to claim 1 wherein the ETEE communication differs from ad hoc ETEE communication.

13. The method according to claim 12 comprising determining a memory unit to be used during the first user ETEE communication; wherein the determining comprises selecting a location of the memory unit.

14. The method according to claim 12 comprising determining a memory unit to be used during the first user ETEE communication; wherein the determining comprises selecting whether the memory unit stores the ETEE communication session metadata.

15. The method according to claim 12 comprising determining a memory unit to be used during the first user ETEE communication; wherein the determining comprises determining whether to apply access control to the memory unit.

16. The method according to claim 12 wherein the first user ETEE communication metadata comprises a unique email address that identifies the user to the ETEE communication service.

17. The method according to claim 12 wherein the participating in creating first user ETEE communication metadata comprises requesting the ETEE communication service to generate at least a part of the first user ETEE communication metadata.

18. The method according to claim 12 comprising receiving a request from the first user to wait for a reception of an invitation from the second user to initiate a ETEE communication session.

19. The method according to claim 12 comprising creating a graphical interface to communicate with the first user during at least one of steps (a), (b), (c), (d) and (e).

20. The method according to claim 1 further comprising storing the one or more user keys in the first user device without sending the one or more user keys to servers.

21. The method according to claim 1 further comprising determining a memory unit to be used during the first user ETEE communication wherein the memory unit is a random access memory (RAM) of the first user device and avoiding saving a history of the ETEE communication session.

22. A non-transitory computer readable medium for end to end encrypted (ETEE) communication, the non-transitory computer readable medium stores instructions that once executed by a web application of a first user, cause the web application to:
  a. participate in creating first user ETEE communication metadata; wherein the first user AHETEE metadata comprise a first user identifier and one or more first user keys;
  b. receive a request from the first user to initiate a ETEE communication session with a second user that has a second user ETEE communication metadata;
  c. determine an existence of ETEE communication session metadata, the ETEE communication session metadata facilitates an establishment of a session between the first user and the second user;
  d. request to receive, from a ETEE communication service, the ETEE communication session metadata when not finding the ETEE communication session metadata; and
  e. participate in establishing and maintaining the session between the first user and the second user when finding or receiving the ETEE communication session metadata.

\* \* \* \* \*